United States Patent

Hagie et al.

(10) Patent No.: US 9,157,502 B2
(45) Date of Patent: Oct. 13, 2015

(54) STAPLE BELT FASTENER APPLICATOR TOOL AND METHOD

(75) Inventors: Virgil Layne Hagie, Aurora, IL (US); Pan Yim Ng, Chicago, IL (US); Mark Stevenson, Lombard, IL (US)

(73) Assignee: Flexible Steel Lacing Company, Downers Grove, IL (US)

( * ) Notice: Subject to any disclaimer, the term of this patent is extended or adjusted under 35 U.S.C. 154(b) by 521 days.

(21) Appl. No.: 13/342,678

(22) Filed: Jan. 3, 2012

(65) Prior Publication Data

US 2013/0167356 A1 Jul. 4, 2013

(51) Int. Cl.
  *F16G 13/00* (2006.01)
  *F16G 3/00* (2006.01)
  *B25C 3/00* (2006.01)
  *B25C 7/00* (2006.01)
  *F16G 3/04* (2006.01)
  *F16G 3/16* (2006.01)

(52) U.S. Cl.
  CPC ............... *F16G 3/003* (2013.01); *B25C 3/008* (2013.01); *B25C 7/00* (2013.01); *F16G 3/04* (2013.01); *F16G 3/16* (2013.01); *Y10T 29/49833* (2015.01); *Y10T 29/53713* (2015.01)

(58) Field of Classification Search
  CPC ............ F16G 3/00; F16G 3/003; F16G 3/02; F16G 3/04; F16G 3/16
  USPC .............. 29/432, 467, 505, 521, 525.05, 798, 29/243.51, 243.56, 243.57, 243.58; 227/15, 119, 139, 147, 154, 151
  See application file for complete search history.

(56) References Cited

U.S. PATENT DOCUMENTS

| | | | | |
|---|---|---|---|---|
| 1,128,421 | A * | 2/1915 | Diamond | 72/319 |
| 4,440,336 | A * | 4/1984 | Kifor | 227/4 |
| 4,538,755 | A * | 9/1985 | Schick | 227/152 |
| 4,789,092 | A * | 12/1988 | Schick | 227/111 |
| 5,337,946 | A * | 8/1994 | Richardson et al. | 227/110 |
| 5,368,214 | A * | 11/1994 | Schick | 227/147 |
| 5,531,012 | A * | 7/1996 | Schick | 29/432.1 |
| 6,081,995 | A * | 7/2000 | Herold | 29/798 |
| 6,311,393 | B1 * | 11/2001 | Garner | 29/798 |
| 6,739,038 | B2 * | 5/2004 | Herold | 29/798 |
| 2002/0139644 | A1 * | 10/2002 | Herold | 198/844.2 |
| 2008/0052889 | A1 | 3/2008 | Atkins et al. | |

OTHER PUBLICATIONS

Notification of Transmittal of the International Search Report and the Written Opinion of the International Searching Authority, or the Declaration from the International Bureau of WIPO for corresponding International Application No. PCT/US2012/071803, dated Mar. 13, 2013, 18 pages.

* cited by examiner

*Primary Examiner* — Christopher M Koehler
(74) *Attorney, Agent, or Firm* — Fitch, Even, Tabin & Flannery LLP (57) ABSTRACT

A belt fastener applicator tool and method are provided. The tool is very simple and provides a low cost tool for applying staple belt fasteners to belt ends. The applicator tool includes a plate body having both anvil and comb portions that are fixed thereto so as to be integrated therewith. In one form, the tool has a one-piece construction so that the plate body and anvil and comb portions are integrally formed together. Preferably, the comb portion includes upstanding comb locating members for receiving hinge loops, and the anvil portion includes both initial set anvil wells on one side of the locating members and a final set flat surface portion on the other side of the locating members. The same tool is used for both initial set and final set staple leg setting operations by turning the tool around with an operator using a hammer for staple setting operations.

6 Claims, 11 Drawing Sheets

STAPLE BELT FASTENER APPLICATOR TOOL AND METHOD

FIELD OF THE INVENTION

The invention relates to a tool and method for applying a staple belt fastener to a belt end and, more particularly, to a simplified staple belt fastener tool and method.

BACKGROUND OF THE INVENTION

Hinged belt fasteners having preset or prestaked staples require two distinct staple setting operations for providing the required low profile for the set staples of the fasteners when installed on the end of a conveyor belt. Applicant's assignee herein provides an Ready Set™ series of staple belt fasteners that have upper and lower plates interconnected by a pair of spaced arcuate hinge loops. The staples are prestaked in apertures of the upper plate member. The first setting operation creates an initial set of the legs of the staples by driving the staples through the apertures of the upper plate member in which they are held, through the belt, and through aligned apertures in the lower plate member of the fasteners, and then against a specially configured recessed anvil surface that starts to bend the staple legs. The final set operation involves applying the drive force to the staple to drive the bent, initial set staple legs against a flat anvil surface so they are further bent to be received in a pocket in the lower fastener member so as not to project out therefrom.

For these different staple setting operations, different anvil configurations are employed as described above. The RS staple belt fasteners are applied to the belt end via the use of two separate tools each having anvils that are specially configured for the operation they perform. The first tool has anvils fixed to a base channel with the anvils having recessed wells that are configured to provide an initial set for the staple legs while the other tool has anvils fixed to another base channel that are configured with flat, horizontally oriented anvil surfaces to provide the staple legs with their final set configuration. Both tools use comb members for aligning the staple legs with the anvils, and guide blocks for guiding a tool, such as either a drive rod or rods from a power staple driver tool or a manually held staple driver that is impacted by hammer blows. The staple driver tool is received in guide bores of the guide block to deliver a drive force to the staples. Both tools also use over-center clamp devices that are actuated to urge the guide blocks down against an upward spring bias to apply a downward clamping force on the upper plate of the belt fasteners so that the belt fasteners and belt end are clamped in the tool with the comb member captured between the guide blocks and the anvils thereunder. Depending on the size of the belt fasteners, the appropriately sized comb member is selected and mounted in the tool with the guide blocks and clamp device then mounted to the tool.

After all of the staple legs on each of the fasteners in a fastener strip are provided with their initial set, the clamp devices are released. The belt end can then be pulled out of the initial set tool and put into the final set tool with the initially set staples being aligned with the final set anvils via an appropriately sized comb member in a manner similar to the initial set tool. After the clamp devices are actuated to clamp the belt end with the fasteners thereon in the tool, the staples are driven via a drive member inserted in bores of the guide blocks to provide a final set to the staple legs. As with the initial set tool, the parts of the final set tool (the comb members, guide blocks and clamp devices) need to be assembled together based on the fastener size. Alternatively, it is known that, because of the time needed to load the belt with the initially set staples into another tool, installers may simply flip the belt over and, using a hammer, deliver hammer blows directly to the initially set staple legs to drive them into the pocket of the lower plates. Thus, in this instance the staples are provided with their final set without the use of an anvil for this purpose.

Another more recently developed applicator tool for staple belt fasteners by applicant's assignee herein employs a single applicator tool for applying the staple belt fasteners to belt ends. This applicator tool also includes guide blocks with clamp devices with the guide blocks having bores adapted to receive the nose end of a power staple driving tool therein. A comb plate is mounted to the tool under the guide blocks. In this tool, the belt does not have to be removed from the tool for performing both the initial and final set driving operations on the staple legs. Instead, the tool includes a handle actuator that is operable to lift the guide blocks and comb plate and to slide anvils that have both initial and final set portions formed thereon into proper alignment with the staple legs depending on the staple setting operation that is to be performed. Nonetheless, as is apparent, each of these tools requires a significant number of parts as well as moving parts increasing their complexity and expense.

SUMMARY OF THE INVENTION

In accordance with one aspect of the invention, a tool and method for applying staple belt fasteners to a belt end in a simple and low cost manner are provided. The tool includes a plate body having an anvil portion and a comb portion that are fixed to the plate body to be integrated therewith. In this manner, the tool has no moving parts thus significantly reducing its costs over prior tools used for applying staple belt fasteners, such as the earlier described RS belt fasteners. In addition, because the tool has the anvil and comb portions integrated with the plate body, setting up for use and moving the integrated tool is easier and faster. Rather than having separate guide blocks, comb members and anvil members that need to be assembled for use of the tool, the applicator tool herein is ready for use in allowing an operator to simply insert the fastener hinge loops into the comb portion of the tool for aligning the staples of the fasteners with the anvil portion of the plate body with the preferred tool permitting an operator to use a hammer to manually deliver impact blows directly to the staples for performing a staple leg setting operation. Thus, the necessity and expense of having guide blocks for staple setting is avoided by the preferred tool herein.

In one form of the invention, a belt fastener applicator tool for applying a staple belt fastener to a belt end includes a plate body, an anvil portion of the plate body configured for a staple setting operation, and a comb portion of the plate body adjacent the anvil portion configured for receiving loops of a belt fastener to align a staple thereof with an anvil portion. The anvil and comb portions are fixed to the plate body to be integrated therewith. In a preferred form, the plate body, anvil portion and comb portion are of the same metal material for being formed to have a one piece, unitary construction. As is apparent, the preferred one-piece applicator tool herein is significantly simpler and less expensive to manufacture than prior tools that have multiple, specially made components for cooperating together during the initial set and final set operations for the staples.

In one form, the plate body has opposite sides and the anvil portion comprises an initial set anvil portion adjacent one of the body opposite sides and a final set anvil portion adjacent the other of the body opposite sides with the comb portion disposed between the initial and final set anvil portions intermediate the opposite sides.

In another form, the comb portion includes a row of spaced locator members upstanding from the plate body with the spacing between adjacent locator members sized to receive a hinge loop of the belt fastener therebetween. In a preferred form, the locator members each have an upper end and a predetermined height between the plate body and the upper end that is sized so that with the belt fasteners arranged on the plate body for the staple setting operation with the hinge loops received between the locator members, the upper ends of the locator members extend upwardly beyond the hinged loops to protect the loops from damage during the staple setting operation. Thus, when an operator delivers an impact blow to the staples such as with a hammer, the hammer will impact against the upper ends of the locator members before the loop members disposed therebetween to minimize damage to the loops from the staple setting operation.

In another aspect, a method of applying staple belt fasteners to belt ends is provided including inserting hinge loops of a staple belt fastener between comb locator members projecting upwardly from a plate member of an applicator tool, aligning staples of the staple belt fastener with an initial set anvil portion on one side of plate member adjacent the locator members, creating an initial set of legs of the staples by driving the staple legs against the initial set anvil portion, turning the plate member around and inserting the hinge loops between the comb locator members from the other side of the plate member, aligning the initial set staple legs with the final set anvil portion on the other side of plate member adjacent the locator members, and creating a final set of the legs of the staples by driving the initial staple legs against the final set anvil portion.

The staple belt fastener applicator method preferably includes use of a hand-held, non-powered tool for manually delivering impact blows to the staples for driving the staples to create the initial set and the final set of the staple legs.

DETAILED DESCRIPTION OF PREFERRED EMBODIMENTS

In FIGS. 1-4, a belt fastener applicator tool 10 for installing staple belt fasteners 12 on an end or end portion 14 of a conveyor belt 16 (FIGS. 5-10) is illustrated. The belt fastener applicator tool 10 is a low cost device for applying staple belt fasteners 12 to belt ends 14 as it avoids employing moving parts, and preferably is of a one piece, unitary construction. In this manner, the present belt fastener applicator tool 10 provides a very simple and low cost solution for applying staple belt fasteners 12 to belt ends 14. The applicator tool 10 allows an operator to directly impact the staples 18 with a non-powered staple driver tool such as a hammer since the tool 10 is not adapted to be used with guiding devices such as guide blocks for guiding an impact delivering member of a staple driver tool. As such, no clamping devices as are commonly associated with the guide blocks need to be actuated and released for operation of the tool 10 described herein.

The tool 10 includes a plate member 20 having a plate body 22 with upper and lower surfaces 24 and 26 that extend generally parallel to each other. The plate body 22 has an anvil portion 28 and a comb portion 30 that are both fixed relative thereto. Both the fixed anvil portion 28 and the fixed comb portion 30 of the applicator tool 10 herein are integrated with the plate body 22 in that no preassembly thereof is required for the operator in order to use the tool 10 for installing the staple belt fasteners 12 on the belt end 14, and there are no moving parts of the applicator tool 10 herein. Since the anvil portion 28 and the comb portion 30 are integrated, the preferred applicator tool 10 can be of a one piece, unitary construction so that the plate body 22, and the anvil portion 28 and the comb portion 30 thereof are integrally formed from the same metallic material, e.g., a cast steel material. This allows the tool 10 herein to minimize the manufacturing costs associated therewith. The cast steel material is harder than the material from which the staples 18 are formed so that the anvil portion 28 of the tool 10 is effective for setting the staples 18, as discussed hereinafter.

As mentioned, the illustrated tool 10 is not adapted for use with a conventional guide block and instead is intended for use in a very simple manner by inserting the fasteners 12 in the comb portion 30 of the tool 10 with the belt end 14 received between the upper and lower plates 32 and 34 thereof so that the staples 18 held by the upper plate 32 are exposed for receiving hammer blows manually delivered by a tool operator. As such, the applicator tool 10 is optimized for use by an operator in the field where oftentimes access to a power supply, such an electrical, pneumatic or hydraulic fluid supply source, can be limited or non-existent. The preferred tool 10 has a relatively small size such that it can support two belt fasteners 12 thereon for a staple setting operation before it needs to be moved along the strip 36 of fasteners 12 for performing staple setting operations for the next adjacent pair of belt fasteners 12. By way of example and not limitation, the plate body 22 can have a generally rectangular configuration with a length of approximately 2.45 inches, a width of approximately 2.00 inches, and a thickness between the upper and lower surfaces 24 and 26 of approximately 0.250 inch. With the above exemplary dimensions, the preferred one-piece, unitary steel tool 10 weighs only approximately 0.33 lbs.

In the preferred and illustrated tool 10, the anvil portion 28 includes both an initial set anvil portion in the form of wells 38 recessed in the upper surface 24 of the plate body 22 and a final set portion in the form of a substantially flat surface portion 40 of the plate body upper surface 24. This allows the same tool 10 to be used for both initial and final set operations on the staple legs 48. The comb portion 30 includes upstanding comb locating members 42 that extend upwardly from the plate body upper surface 24. The locating members 42 extend in a row along the length of the plate body 22 to essentially divide the plate into opposite sides 44 and 46 with the row of locating members 42 disposed at an intermediate location therebetween. The comb locating members 42 are located adjacent the recessed anvil wells 38 and the flat anvil surface portion 40 such that when the staple belt fasteners 12 are received in the comb portion 30, the staples 18 will be aligned with either the anvil wells 38 or the anvil surface portion 40 depending on how the fasteners 12 are inserted into the comb portion 30.

More specifically, for the initial set operation for the staples 18, the staple belt fasteners 12 will be inserted from the plate side 44 into the comb portion 30 so that the staples 18, which have their legs 48 held in apertures 50 in the fastener upper plate 32, will be aligned over the wells 38. As shown, each fastener 12 has a pair of staples 18. Thus, there are two sets of recessed wells 38 with each set including two pairs of wells 38 to correspond to the four legs 48 of the pair of staples 18 of the fastener 12 aligned over the set of wells 38. FIGS. 5-8 show the fasteners 12 on the belt end 14 received in the comb portion 30 of the tool 10 in position for creating an initial set of the staple legs 18, with FIG. 7 showing one of the fasteners 12 removed with the belt 16 in phantom to show the initial set anvil wells 38 to be positioned to be vertically aligned with the staples 18. In addition, the apertures 52 in the fastener lower plate 34 generally aligned with the upper plate apertures 50 will be disposed in alignment over the anvil wells 38. In this manner, when an operator hits the head 54 of the staples with a hammer blow, the impact force will drive the staple legs 48 down through the apertures 50, the belt end 14, and the lower plate apertures 54, and into the anvil wells 38 therebelow. This causes the staple legs 48 to be bent from the vertical orientation in an initial set configuration thereof ready for the final set operation thereon, as can be seen in FIG. 9.

Figure 8:
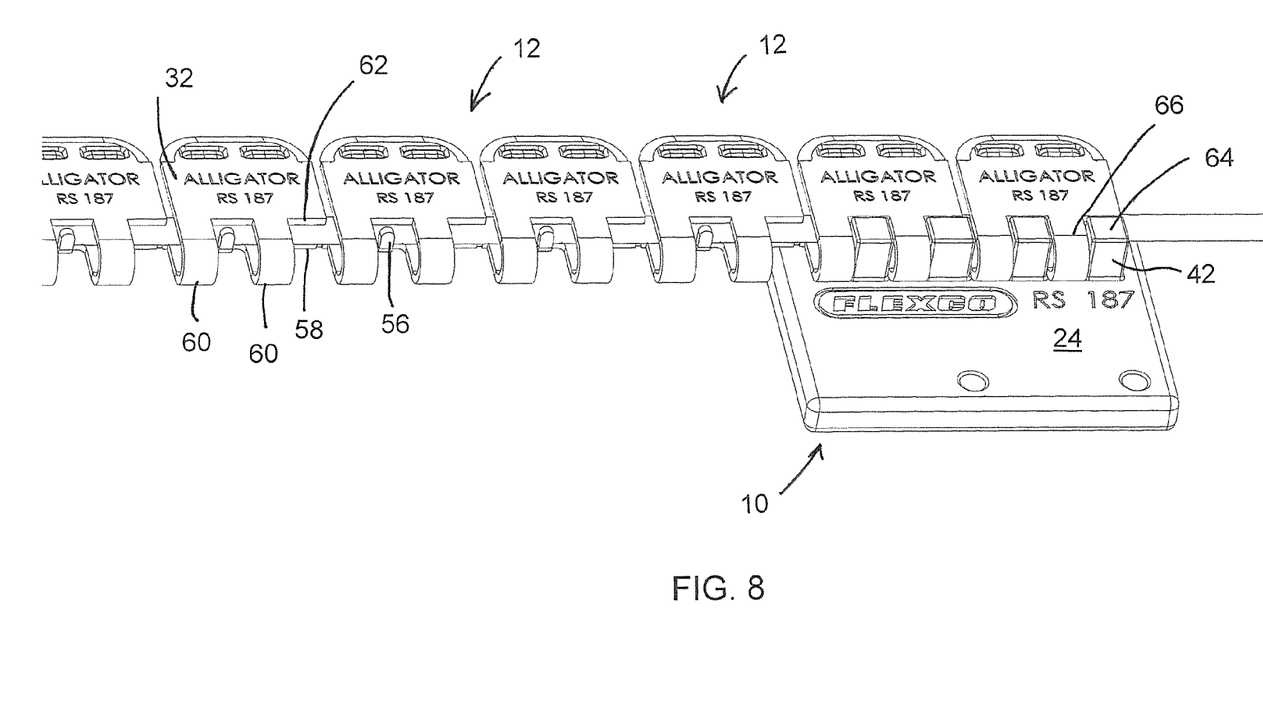
FIG. 8 is a perspective view similar to FIG. 5 showing the position of the applicator tool at the other side of the belt end with the final pair of belt fasteners thereon and the tool having been used to create an initial set of the legs of the staples of all of the belt fasteners on the belt end.
Figure 9:
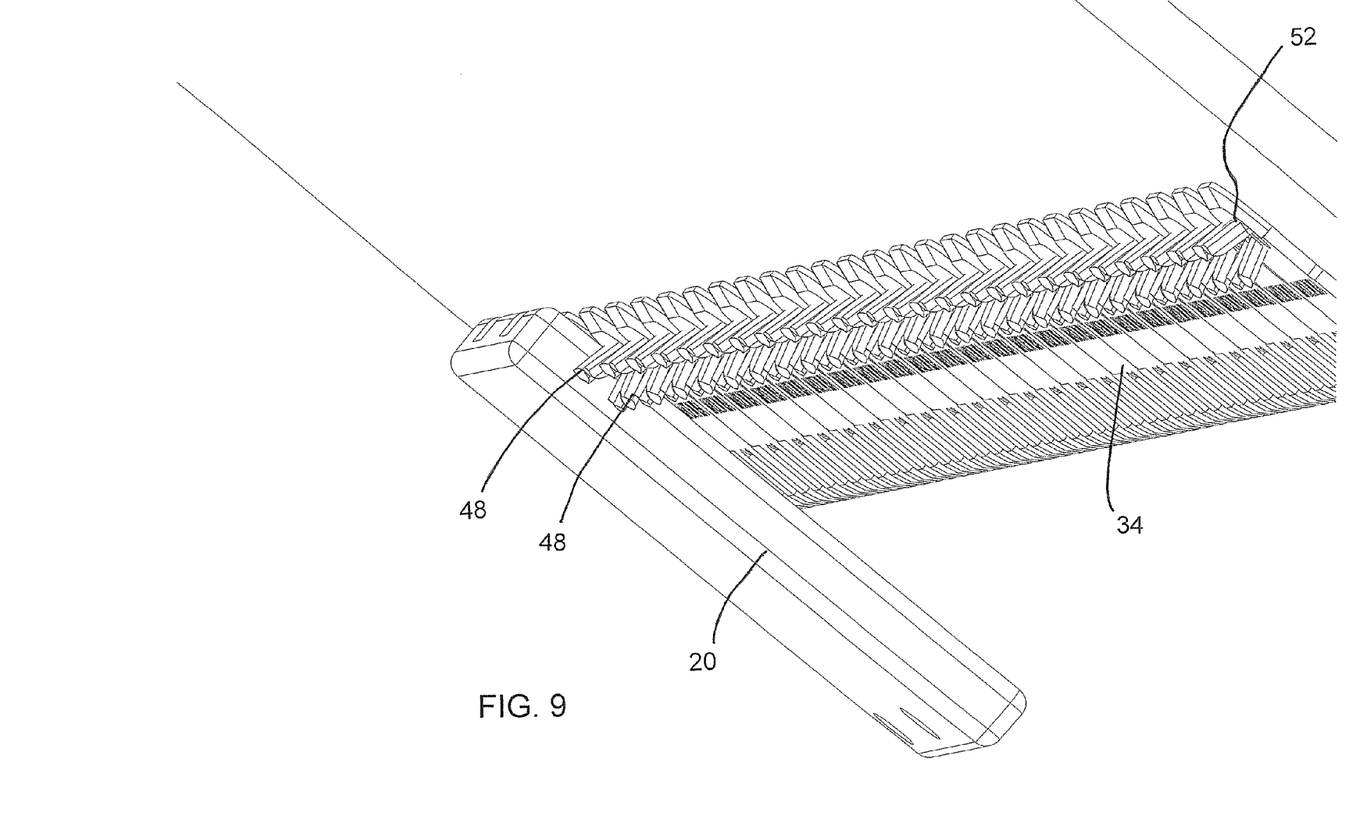
FIG. 9 is a bottom perspective view showing the initially set staple legs bent by the anvil wells and projecting through apertures of the lower plates of the belt fasteners.

The fasteners 12 have a belt stop in the form of an upturned tab member 56 that extends upwardly from a rear edge 58 of the fastener lower plate 34, as shown in FIG. 8. A pair of laterally spaced arcuate hinge loops 60 extend out from the lower plate rear edge 58 on either side of the fastener tab member 56 and curve back to corresponding rear edge 62 of the fastener upper plate 32 to interconnect the fastener plates 32 and 34 with the hinge loops 60 being offset to one side of the fastener plates 32 and 34. The upper plate 32 extends at a slight upward incline relative to the lower plate 34 from the rear edge 62 to the forward edge 63 of the upper plate 32 so that the belt end 14 can be more easily fit between the upper and lower plates 32 and 34. This belt fastener construction is in practice in Applicants assignee's RS staple belt fasteners and is described in their U.S. Pat. No. 5,638,582, which is incorporated as if reproduced in its entirety herein.

The comb locating members 42 are each laterally spaced from an adjacent locating member 42 by a space sufficient to receive a hinge loop 60 therebetween. Thus, to insert the fasteners 12 into the comb portion 30 of the tool 10, the hinge loops 60 of the fasteners 12 are aligned to fit into the spaces between the locating members 42, and the rear edge 62 of each of the upper plates 32 is brought into engagement with the comb locking members 42 either by shifting the fastener lower plate 34 along the tool upper surface 24 or shifting the tool 10 to slide the tool upper surface 24 along the bottom of the fastener lower plate 34, or both. With the belt end 14 fully received between the fastener plates 32 and 34 in abutment with the fastener tab members 56, an operator can hammer the staples 18 aligned over the anvil portion 28 of the tool 10 for a staple setting operation.

Figure 10:
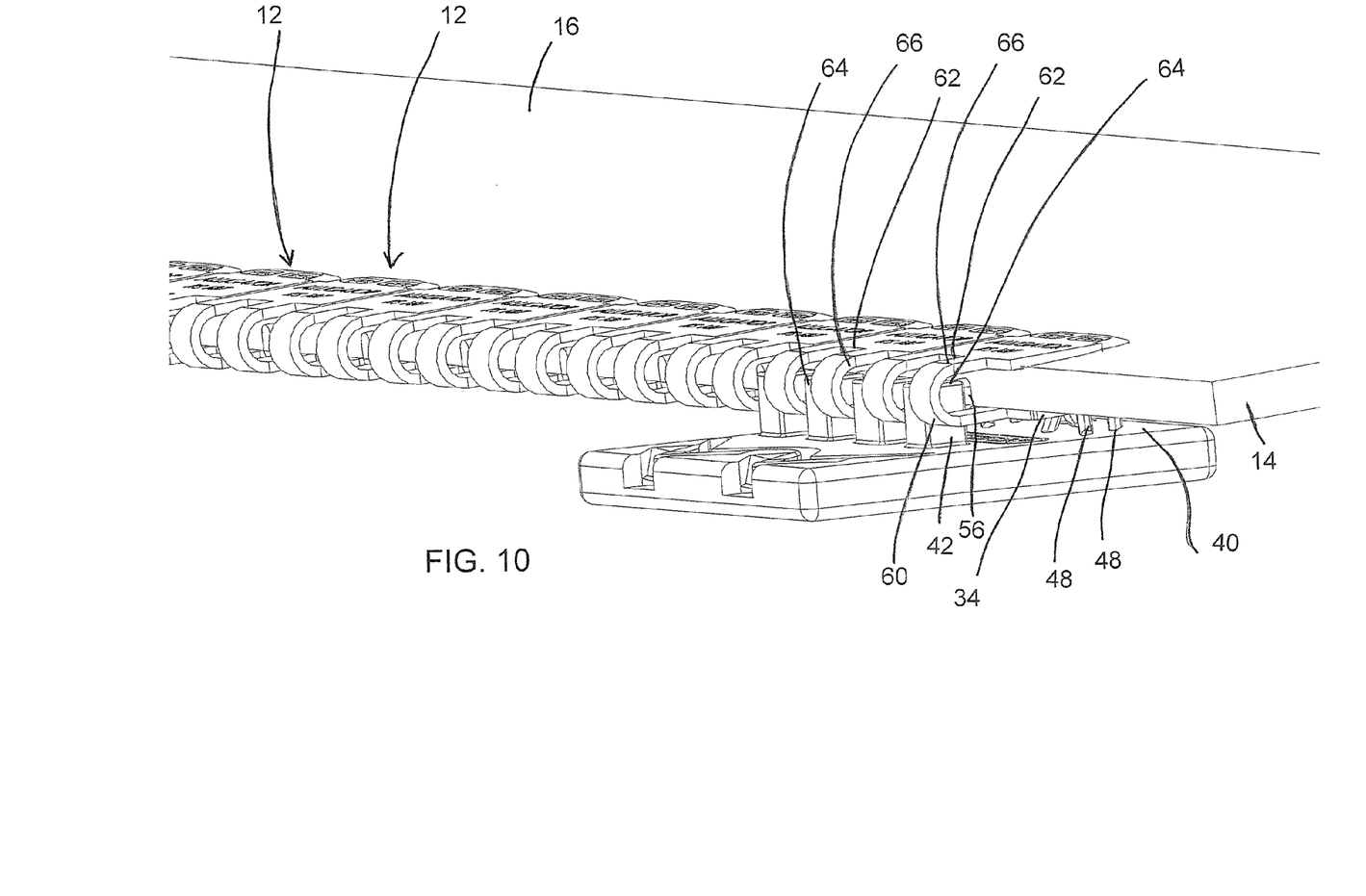
FIG. 10 is a perspective view showing the applicator tool with a pair of belt fasteners received thereon for being used to create a final set of the initial set staple legs of the pair belt fasteners with the initial set staple legs supported on the final set flat surface portion of the plate body.

It should be noted that after the initial set operation, the fastener plates 32 and 34 will be clamped onto the belt end 14 to extend generally parallel to each other. In this configuration, the fastener tab members 56 are generally aligned with the corresponding rear edges 62 of the upper plates 32. Because the fasteners 12 including the upper plates 32 thereof will be raised from tool 10 when the fasteners 12 are inserted into the comb portion 30 for the final set operation due to the initial set staple legs 18 projecting down beyond the bottom plates 34, the rear edges 62 of the plates 32 will be above the locating members 42 and instead the tab members 56 will abut the comb locating members 42 when the fasteners 12 with the initial set staples 18 are inserted onto the tool 10, as can be seen in FIG. 10.

Figure 5:
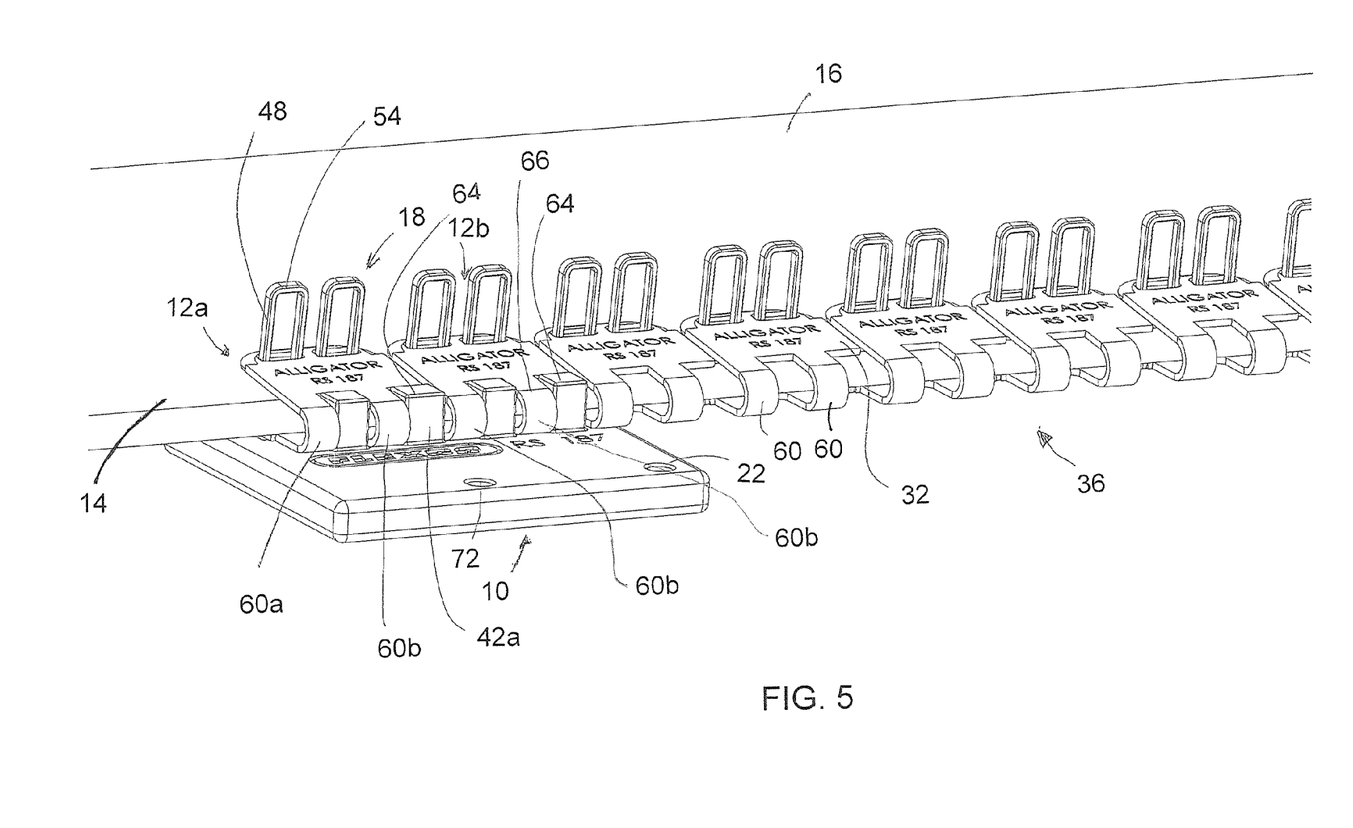
FIG. 5 is a perspective view of belt fasteners on a belt end and having their hinge loops received between the comb locating members.
Figure 6:
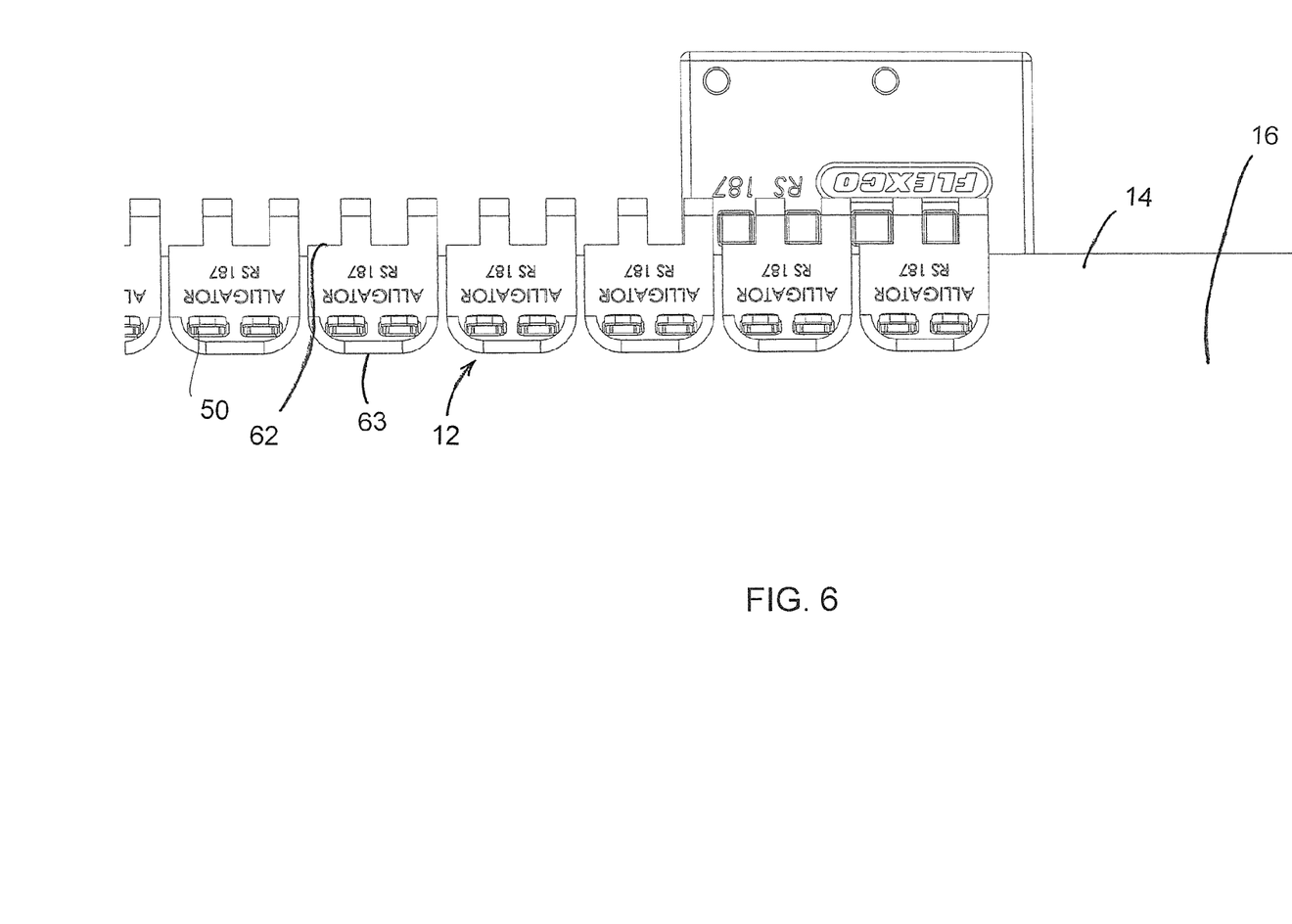
FIG. 6 is a plan view similar to FIG. 5 showing the larger width comb locating member between adjacent hinge loops of different adjacent belt fasteners on the applicator tool.
Figure 7:
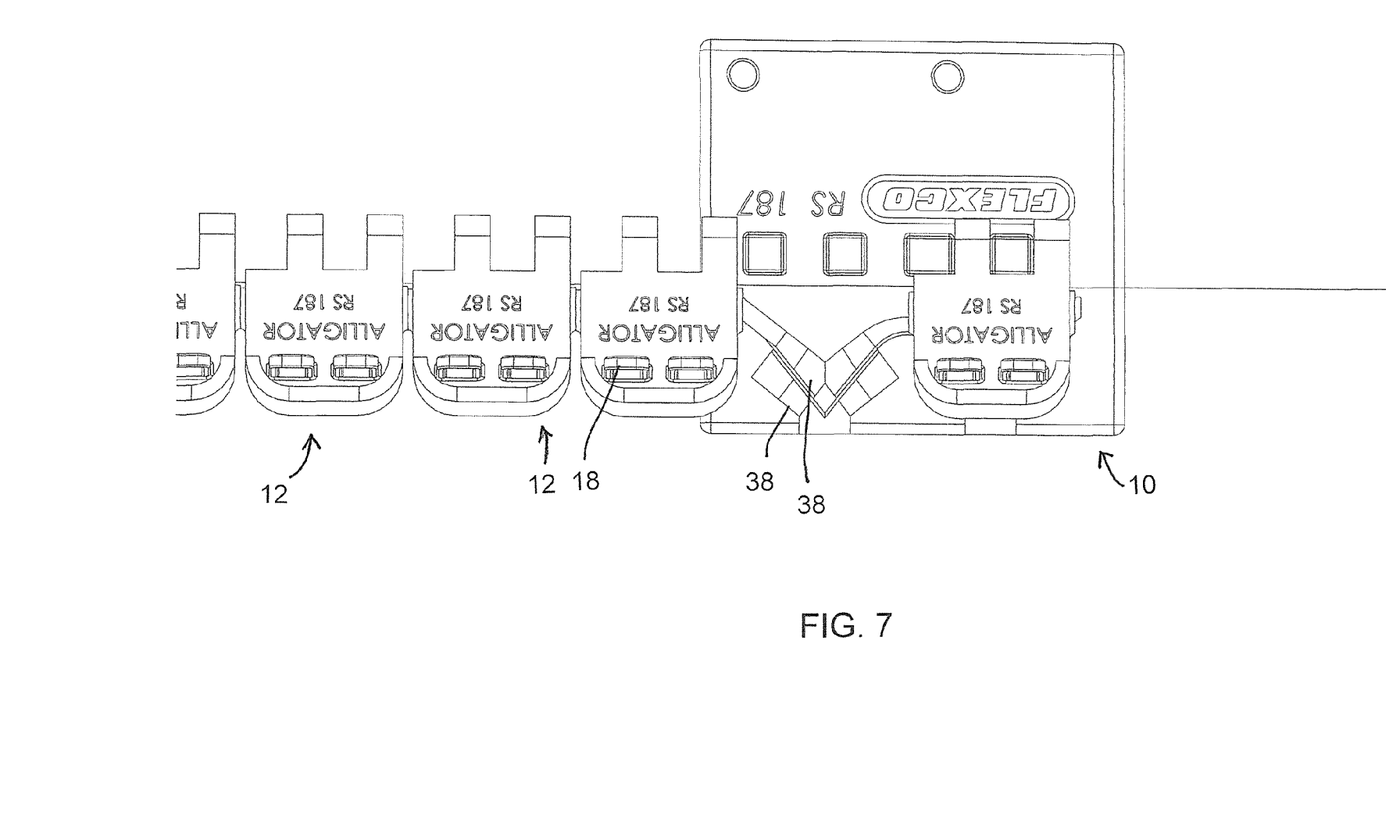
FIG. 7 is a plan view similar to FIG. 6 with one of the fasteners on the tool removed and the belt in phantom to show the anvil wells oriented to be in vertical alignment with the staples of the belt fasteners on the tool.

FIGS. 5-7 show one of the endmost pairs of the belt fasteners 12 of the fastener strip 36 with the belt end 14 between the plates 32 and 34 thereof and the pair of belt fasteners 12 received in the tool comb portion 30 such that the fastener staples 18 are aligned with the recessed wells 38 of the anvil portion 28 of the plate body 22. After the staple legs 48 of the staples 18 of the initial pair of belt fasteners 12 are provided with their initial set, the compact and light weight applicator tool 10 herein can easily be slid out from under the pair of belt fasteners 12 on the belt end 14, moved down along the belt end 14 and the belt fasteners 12 thereon, and slid under and the next adjacent pair of belt fasteners 12 for the initial set operation for the staples 18 of these fasteners 12.

With respect to the locating members 42 of the comb portion 30, the locating members 42 each have a height from the plate body upper surface 24 to their respective upper ends 64. The height of locating members 42 is sized so that with the hinge loops 60 received therebetween and the staples 18 aligned with the initial set anvil wells 38, the upper ends 64 will project beyond the adjacent upper leg portions 66 of the hinge loops 60 on either side thereof, as can be seen in FIGS. 5 and 8. This protects the hinge loops 60 from being damaged by imprecise hammer blows to the staples 18 during the initial set operation. The height of the locating members 42 will be coordinated with the size of fasteners 12. For example, there are three different sizes of RS staple belt fasteners where the distance between the fastener plates 32 and 34 is different. For the largest RS fastener, for instance, the height of the locating members 42 is approximately 0.30 inches. For the smaller size RS fasteners, the locating member height can be lower.

With the plate body 22 sized for receiving the pair of belt fasteners 12 thereon, and the belt fasteners 12 each including a pair of hinge loops 60, the comb portion 30 includes four locating members 42 that are laterally spaced so that three hinge loops 60 can be received in the three lateral spaces formed between adjacent pairs of the four locating members 42. The row of four locating members 42 includes two end locating members and two middle locating members. Since the adjacent hinge loops 60a and 60b of the two different belt fasteners 12a and 12b on the tool 10 have a greater lateral spacing from each other than do the hinge loops 60a or 60b of an individual belt fastener 12a or 12b, respectively, one of the middle comb locating members 42a is provided with a greater lateral width than the other locating members 42 so as to fit more snugly between the hinge loops 60a and 60b having the greater spacing therebetween. For instance, the lateral width of the middle locating member 42a can be approximately 0.265 inch while the lateral width of the narrower, remaining three locating members 42 can each be approximately 0.22 inch.

Figure 1:
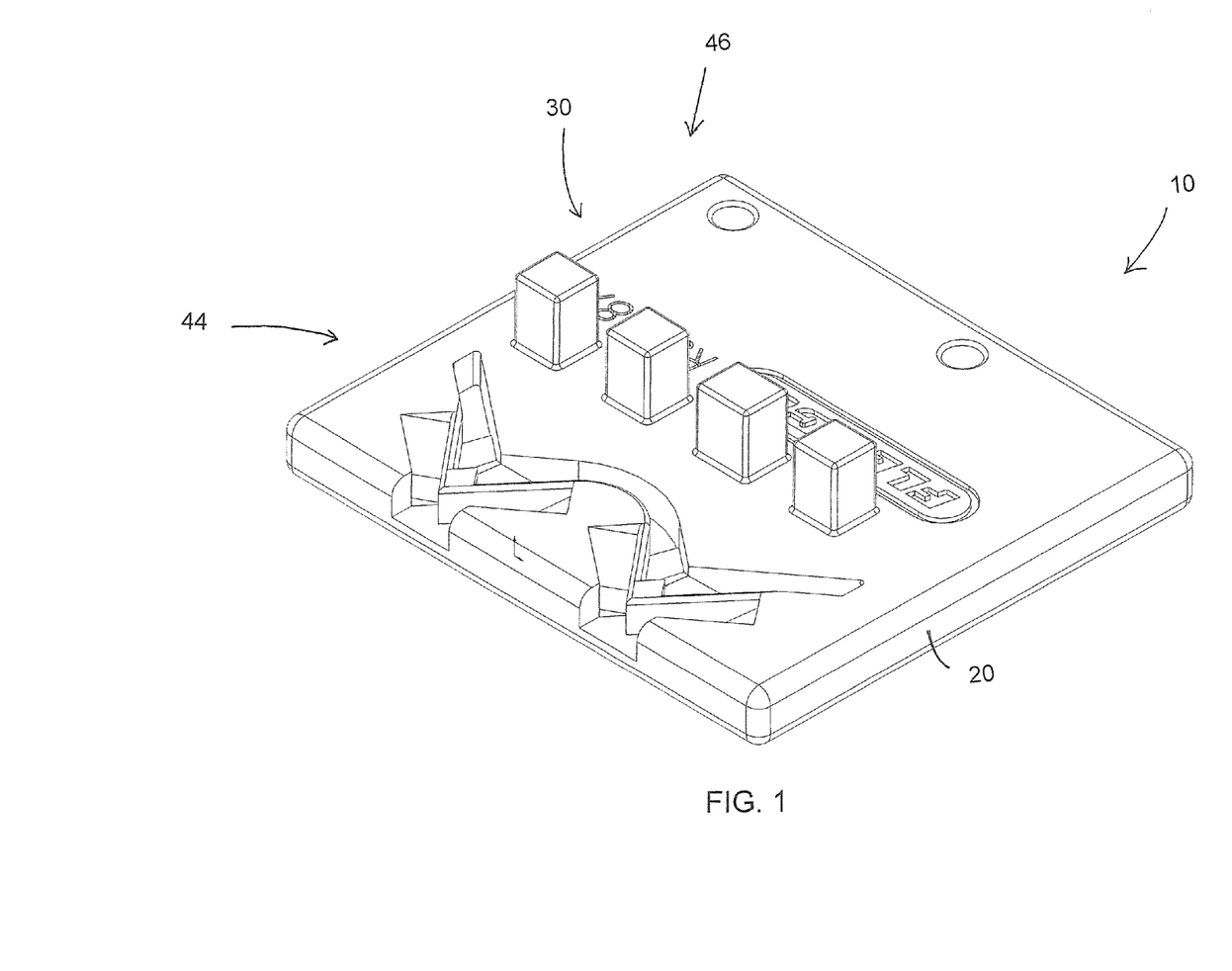
FIG. 1 is a perspective view of a belt fastener applicator tool showing a plate body having comb locating members and anvil portions on either side thereof integrated with the plate body.
Figure 2:
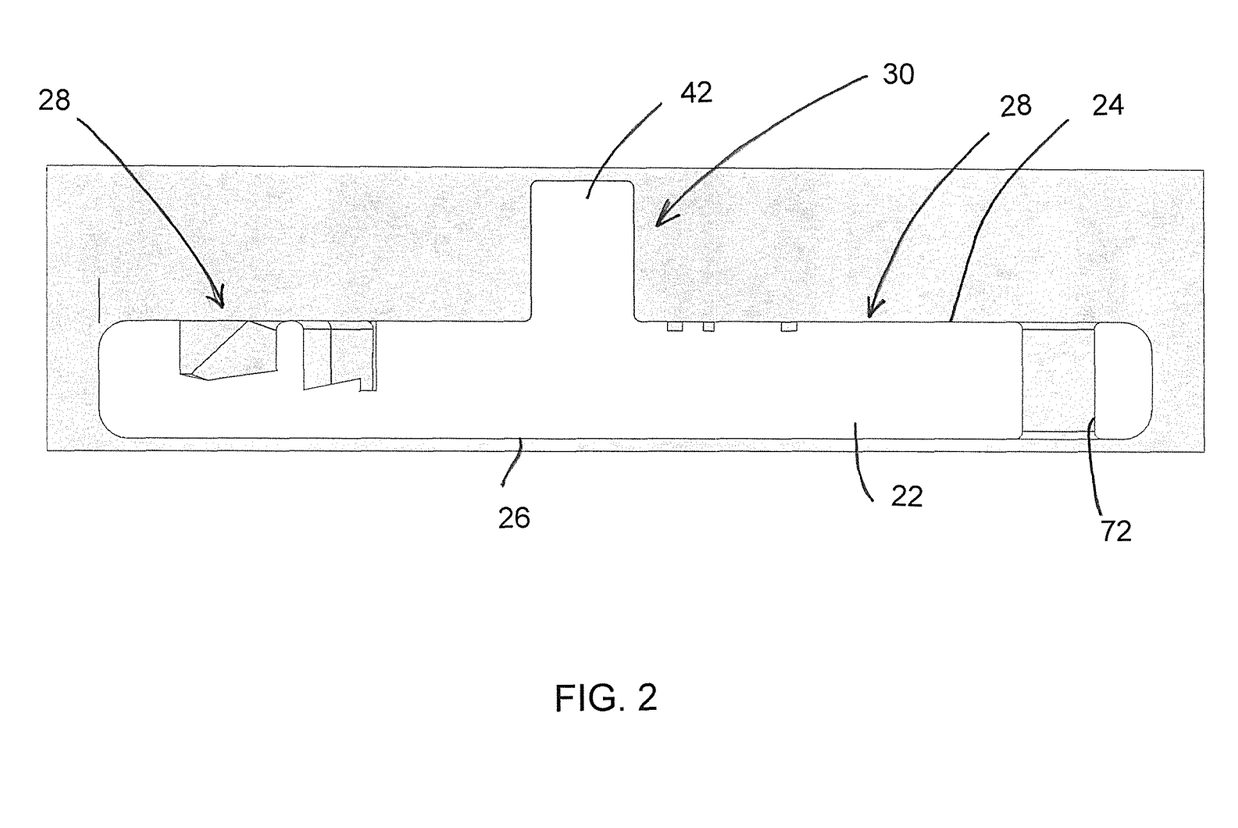
FIG. 2 is a cross-sectional view of the applicator tool of FIG. 1 showing recessed anvil wells adjacent the comb locating members on one side of the plate body a flat anvil surface portion adjacent the comb locating members on the other side of the plate body.
Figure 3:
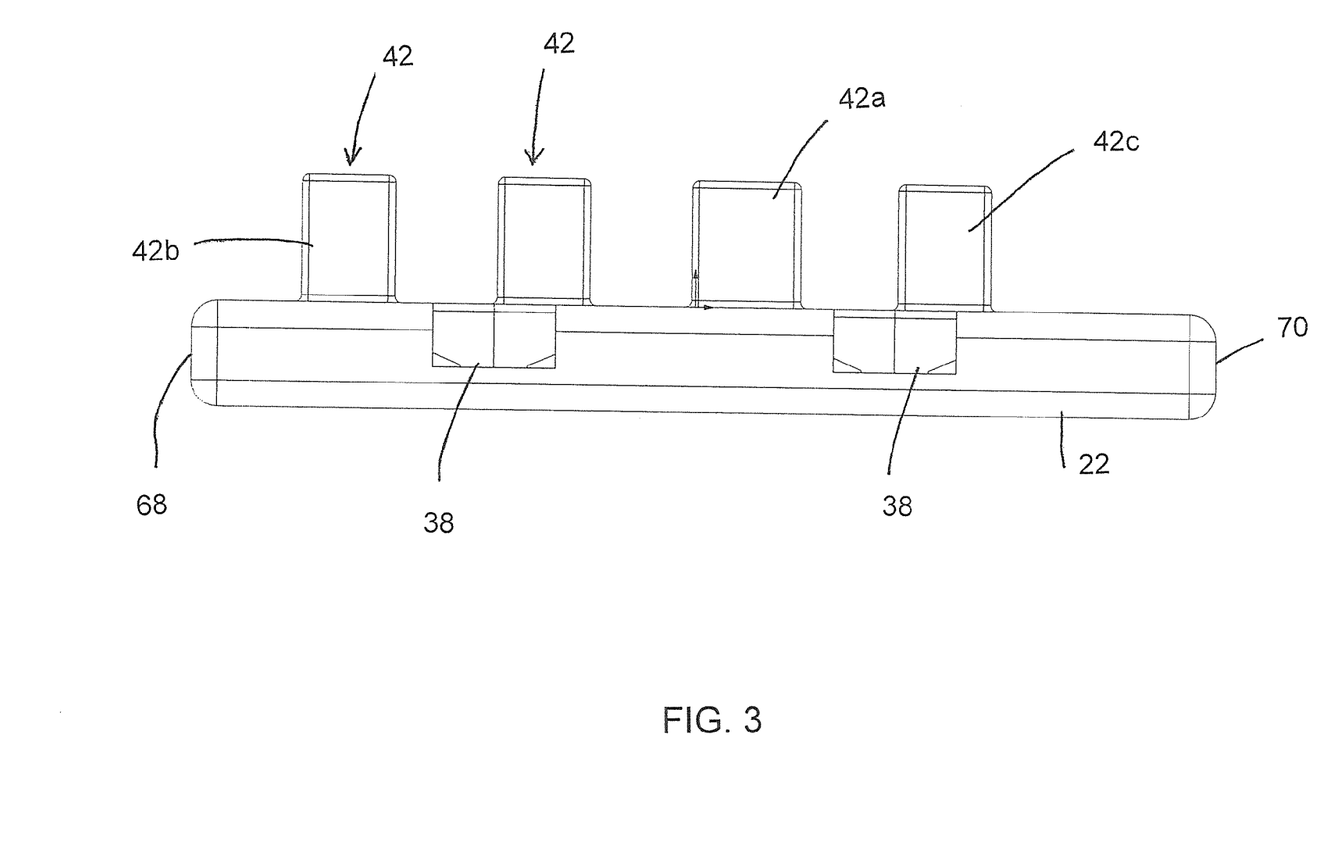
FIG. 3 is a side elevational view of the applicator tool of FIG. 1 showing the lateral spacing between the comb locating members with one of the comb locating members being of a larger width than the others.
Figure 4:
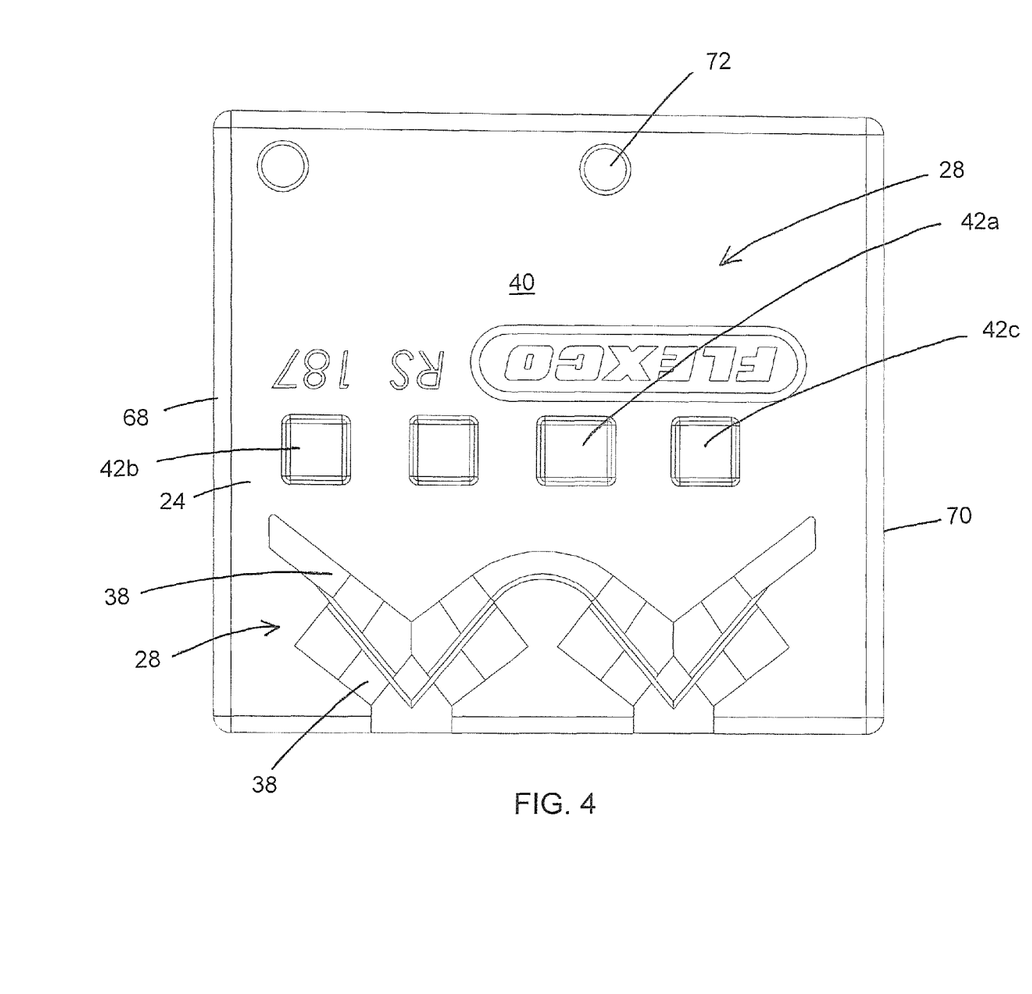
FIG. 4 is a plan view of the applicator tool showing the comb locating members arranged in a row between the initial set anvil wells on one side of the plate body and the final set flat surface portion on the other side of the plate body.

The larger width locating member 42a also advantageously requires that the fasteners 12 be inserted in the comb portion 30 properly so that, for example, the staples 18 are always properly aligned with the underlying anvil wells 38 for the initial set operation of the staple legs 48. Further, because the hinge loops 60 are offset to one side of the fasteners 12, the row of locating members 42 is also offset to one side of the plate body 22, as can be seen in FIGS. 3 and 4. In this regard, end locating member 42b is closer to the short side edge 68 of the rectangular plate body 22 than opposite short side edge 70 with the larger width locating member 42a adjacent to the locating member 42c at the opposite end of the row of locating members 42. Thus, when the pair of belt fasteners 12 are received in the comb portion 30 from the plate side 44 for the initial set operation, the one hinge loop 60 that is not received between a pair of the locating members 42 will extend along end locating member 42c between it and the plate body edge 70 and this hinge loop 60 is one that is aligned with one of the side edges of the fasteners plates 32 and 34 so that the fasteners 12 will be generally centered on the plate body 22 between the opposite sides 68 and 70 thereof, as can be seen in FIGS. 5-8. This corresponds to the centering of the sets of recessed wells 38 on the plate body 22 between the opposite sides 68 and 70 thereof.

On the other hand, when the pair of fasteners 12 are received in the comb portion 30 from the plate side 46 for the final set operation, again the one hinge loop 60 that is not received between a pair of the locating members 42 will extend along end locating member 42c between it and plate edge 70. However, this will be the other hinge loop 60 of the fastener 12 that is offset from both of the side edges of the fastener plates 32 and 34 so that the fasteners 12 are not centered between the plate body sides 68 and 70. Because the final set surface portion 40 has a flat configuration that extends from one side 68 of the plate body 22 to the other side 70, precision alignment of the staples 18 is not as critical as with the centered set of wells 38 for the initial set operation and thus the non-centered orientation of the fasteners 12 is more readily accommodated.

As previously described, after the staple legs 48 for the initial pair of belt fasteners 12 are provided with their initial set, the tool 10 is easily and quickly removed from under the belt end 14 and shifted to support the next adjacent pair of belt fasteners 12 for the initial set operation in the same manner as the first pair of belt fasteners 12 are oriented for the initial set operation of the staples 18 thereof. After all of the fasteners 12 in the fastener strip 36 on the belt end 14 have their staples 18 provided with their initial set as can be seen in FIGS. 8 and 9, the applicator tool 10 can be slid out from under the belt end 14, and turned around 180° so that the belt fasteners 12 can then be inserted into the comb portion 30 from the other plate side 46. Manifestly, an operator may choose to perform the final set operation on initial set staple legs before all of the fasteners 12 in the fasteners strip 36 have their staple legs 48 provided with their initial set.

Figure 11:
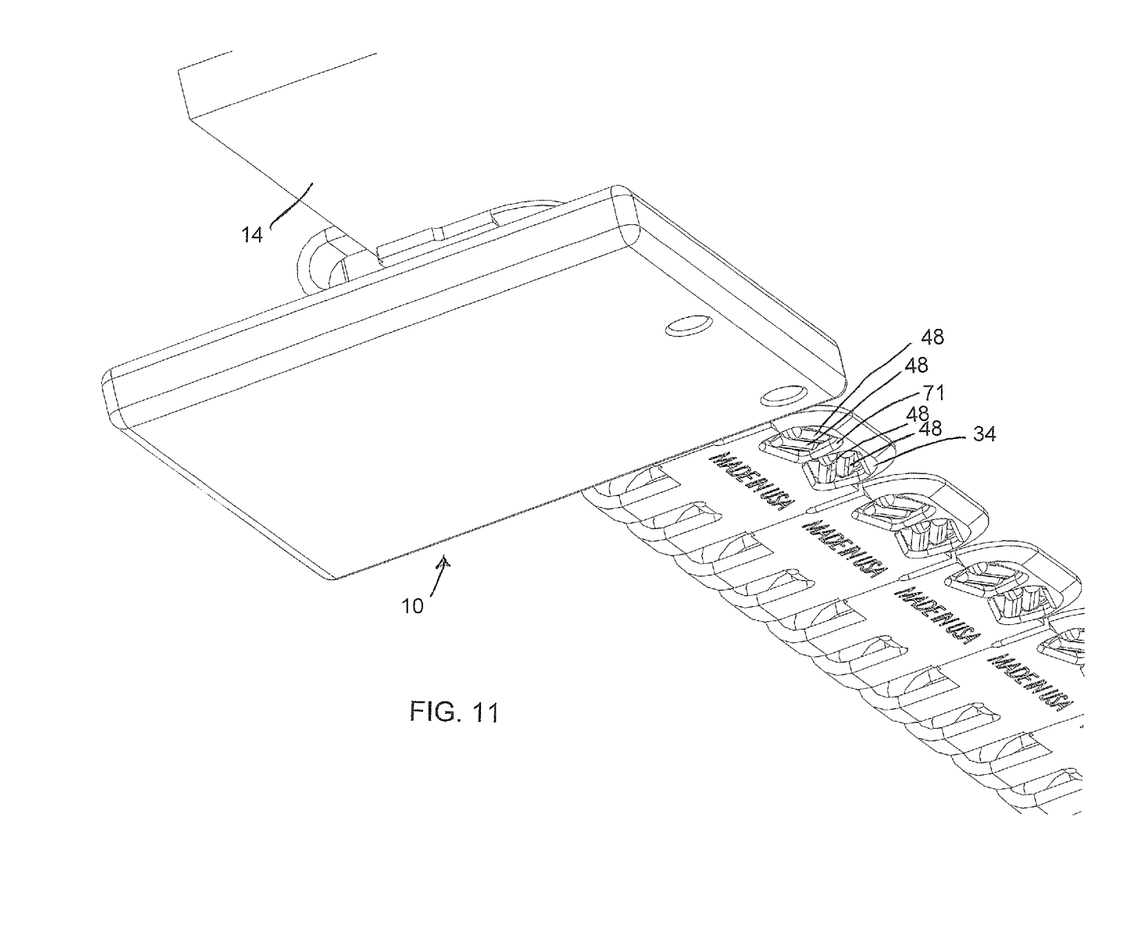
FIG. 11 is a bottom perspective view showing the final set staple legs bent to be fully received in pockets of the lower plates.

When the belt fasteners 12 having the initially set staple legs 48 are received in the comb portion 30, the initial set staple legs 48 will be aligned with the anvil surface portion 40. Since the staple legs 48 are projecting beyond the fastener bottom plate 34, the bottom plate 34 will be pivoted up with the ends of the initial set, bent staple legs 48 (FIG. 9) engaged against the flat anvil surface portion 40. In this instance, the hinge loops 60, and specifically the upper leg portions 66 will be raised slightly above the adjacent upper ends 64 of the locating members 42, as can be seen in FIG. 10. At this time, an operator can use the same hammer for impacting the staples 18 to create a final set of the legs 48 thereof against the substantially flat anvil surface portion 40. This causes the staple legs 48 to be further bent against the fastener lower plate 34 to create the final set, with the final set staple legs 48 fully received in recessed pockets 71 formed in the lower plate 34, as shown in FIG. 11. As the staple legs 48 continue to be further bent during the final set hammering operation, the fastener bottom plate 34 will be pivoted down toward and against the plate body upper surface 24 which lowers the raised, upper leg portions 66 of the fastener loops 60. Once the loop leg portions 66 are lowered to be slightly below the adjacent locating member upper ends 64, the locating members 42 once more protect the hinge loops 60 from potential damage by imprecise hammer blows as the final set hammering operation continues. As with the initial set operation, the tool 10 is moved down along the belt end 14 to be used for creating the final set of the legs 48 of the staples 18 of the pairs of belt fasteners 12 until all of the fasteners 12 have their staple legs 48 provided with a final set.

The plate body 22 can be provided with a pair of through apertures 72 for allowing the tool 10 to be secured to a support member. In this manner, the impact forces generated by the hammer blows during the initial and final set operations can be transmitted from the metallic plate body 22 to the underlying support member. For example, an operator can drive nails through the apertures 72 into a piece of wood (e.g., a plywood board) so that the tool 10 is secured thereto, thereby minimizing damage to the support surface under the board and onto which the tool 10 would otherwise be directly placed.

Those skilled in the art will recognize that a wide variety of modifications, alterations, and combinations can be made with respect to the above described embodiments without departing from the spirit and scope of the invention, and that such modifications, alterations, and combinations, are to be viewed as being within the scope of the invention.

What is claimed is:

1. A belt fastener applicator tool for applying a staple belt fastener having a pair of hinge loops to a belt end, the belt fastener applicator tool comprising:
    a plate body;
    an anvil portion of the plate body configured for a staple setting operation; and
    a comb portion of the plate body adjacent the anvil portion configured for receiving loops of a belt fastener to align a staple thereof with the anvil portion with the anvil and comb portions being fixed to the plate body to be integrated therewith, wherein the plate body has opposite sides and the anvil portion comprises an initial set anvil portion adjacent one of the body opposite sides and a final set anvil portion adjacent the other of the body opposite sides with the comb portion disposed between the initial and final set anvil portions intermediate the opposite sides, and the initial set anvil portion comprises recesses in the plate body and the final set anvil portion comprises a substantially flat surface of the plate body, whereby the belt fastener applicator tool has no moving parts, wherein the comb portion comprises a row of spaced locator members upstanding from the plate body including a pair of end locator members and middle locator members between the pair of end locator members, adjacent locator members being spaced for receiving one of the hinge loops of the staple belt fastener therebetween with one of the middle locator members being wider than adjacent ones of the locator members.

2. The belt fastener applicator tool of claim 1 wherein the plate body, the anvil portion and the comb portion are of the same metal material for being formed to have a one-piece, unitary construction.

3. The belt fastener applicator tool of claim 1 wherein the locator members each have an upper end and a predetermined height between the plate body and the upper end that is sized so that with belt fasteners arranged on the plate body for the staple setting operation with the hinge loops received between the locator members, the upper ends of the locator members extend upwardly beyond the hinge loops to protect the loops from damage during the staple setting operation.

4. The belt fastener applicator tool of claim 1 wherein the spaced locator members comprise four locator members for receiving hinge loops of a pair of belt fasteners therebetween to allow staple setting operations to be performed on the pair of belt fasteners before having to shift the plate body for another staple setting operation.

5. The belt fastener applicator tool of claim 4 wherein the row of four locator members comprises the pair of end locator member and the middle locator members comprise a pair of middle locator members, and the wider one of the middle locator members is wider than the remaining locator members and sized so that the wide middle locator member cannot fit between the hinge loops of one belt fastener and can only fit between hinge loops of adjacent belt fasteners.

6. In combination, a staple belt fastener and a belt fastener applicator tool for applying the staple belt fastener to a belt end, the combination comprising:
   a plate body of the belt fastener applicator tool having a row of spaced locator members upstanding from the plate body and an initial set anvil portion adjacent one side of the body and a final set anvil portion adjacent the other, opposite side of the body with the row of spaced locator members extending between the initial and final set anvil portions;
   upper and lower plates of the staple belt fastener;
   at least one staple having a pair of staple legs carried by the upper plate;
   a pair of arcuate hinge loops interconnecting the upper and lower plates, the staple belt fastener being sized so that with the staple belt fastener lower plate on the belt fastener applicator plate body and one of the locator members received between the pair of arcuate hinge loops, the staple will be aligned with either the initial set anvil portion with the lower plate thereon or the final set anvil portion with the lower plate thereon for creating an initial set of the staple legs or a final set of the staple legs, respectively.

\* \* \* \* \*